(12) United States Patent
Terashima et al.

(10) Patent No.: US 9,321,659 B2
(45) Date of Patent: Apr. 26, 2016

(54) DESALTING DEVICE

(75) Inventors: Mitsuharu Terashima, Kitakyushu (JP); Mamoru Iwasaki, Tokyo (JP); Hideaki Iino, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 215 days.

(21) Appl. No.: 14/003,374

(22) PCT Filed: Mar. 23, 2012

(86) PCT No.: PCT/JP2012/057512
§ 371 (c)(1),
(2), (4) Date: Sep. 5, 2013

(87) PCT Pub. No.: WO2012/133184
PCT Pub. Date: Oct. 4, 2012

(65) Prior Publication Data
US 2013/0341263 A1     Dec. 26, 2013

(30) Foreign Application Priority Data

Mar. 31, 2011  (JP) ................................ 2011-077689

(51) Int. Cl.
*C02F 1/42* (2006.01)
*B01J 47/02* (2006.01)

(52) U.S. Cl.
CPC . *C02F 1/42* (2013.01); *B01J 47/022* (2013.01)

(58) Field of Classification Search
CPC .... B01J 47/022; C02F 1/42; C02F 2001/427; B01D 24/14

USPC .......................................... 210/289, 291, 293
See application file for complete search history.

(56) References Cited

U.S. PATENT DOCUMENTS

| 2,680,714 | A | * | 6/1954 | Carlsson et al. | ............... 210/190 |
| 3,004,668 | A | * | 10/1961 | Adams | .......................... 210/293 |
| 6,730,229 | B1 | | 5/2004 | Pandya | |
| 6,790,357 | B2 | * | 9/2004 | Norell | ........................... 210/345 |

FOREIGN PATENT DOCUMENTS

| GB | 872632 A | 7/1961 |
| JP | S38-000537 B1 | 1/1963 |
| JP | S53-26355 U | 3/1978 |
| JP | S56-091850 A | 7/1981 |
| JP | S61-29837 U | 2/1986 |
| JP | H09-294934 A | 11/1997 |

OTHER PUBLICATIONS

Europe Patent Office, "Search Report for EP 12762739.6," Aug. 12, 2014.

* cited by examiner

*Primary Examiner* — Matthew O Savage
(74) *Attorney, Agent, or Firm* — Manabu Kanesaka

(57) ABSTRACT

Provided is a desalting device which includes a tower body and a bulge portion bulging downward therefrom, and which prevents uneven flow and causes no dead space within the tower body. The desalting device includes a tower body having a bulge portion 1*b* bulging downward at a bottom portion thereof, an ion-exchange resin packed in the tower body, and a plurality of strainers 3 for collecting water being arranged within the bulge portion 1*b*. The strainers are arranged only in a central region of an inside of the bulge portion excluding an outer peripheral portion of the bulge portion.

2 Claims, 6 Drawing Sheets

DESALTING DEVICE

FIELD OF INVENTION

The present invention relates to a desalting device including a tower body and an ion-exchange resin packed in the tower body, and particularly relates to a desalting device in which the tower body has a bulge portion bulging downward from the bottom thereof and a plurality of strainers for collecting water are arranged within the bulge portion.

BACKGROUND OF INVENTION

Desalting devices including a tower body and an ion-exchange resin packed therein have been widely used. The tower body has a bulge portion bulging downward from the bottom thereof, and a plurality of strainers are arranged on an inside of the bulge portion. The tower body having the bulge portion at its bottom portion has a high pressure resistance. FIG. 4 and FIGS. 5 and 6 show conventional desalting devices described in FIGS. 7 to 9 of Patent Literature 1.

The desalting device shown in FIG. 4 includes a tower body 1 having a cylindrical straight body portion 1a and a bulge portion 1b formed at a bottom portion of the tower body. A strainer plate 2 is provided at the upper side of the bulge portion 1b, and a plurality of strainers 3 for collecting water are provided on the strainer plate 2. The strainer plate 2 is also formed to have a downward bulging shape. Each strainer 3 has a hollow truncated cone shape, and a large number of slits are provided in its lateral peripheral surface. Each strainer 3 has a foot pipe with a short pipe shape, and the foot pipe extends through the strainer plate 2. The foot pipe is fixed to the strainer plate 2 by means of a nut (not shown) or the like. An ion-exchange resin R is packed at the upper side of the strainer plate 2. Raw water to be treated is passed through the ion-exchange resin R in a downward flow, flows through the strainers 3, and flows into a water collecting chamber 4 at the lower side of the strainer plate 2, and is taken out through an outlet 5.

In the desalting device, the distance $L_1$ from the upper surface of a packed bed of the ion-exchange resin R to each strainer 3 at the outer peripheral side is shorter than the distance $L_2$ from the upper surface of the bed to the strainer 3 at the central portion. Thus, uneven flow occurs in which water flows in a larger amount at the outer peripheral side where the distance from the upper surface of the packed bed of the ion-exchange resin R is smaller than at the central portion. As a result thereof, desalted water flowing through each strainer 3 at the outer peripheral side into the water collecting chamber 4 indicates poor water quality, since the water made contact with the ion-exchange resin R in a short time compared to the average resistance (retention) time. In addition, the ion-exchange resin R at the outer peripheral side causes breakthrough earlier than the resin in the central portion.

FIGS. 5 and 6 show the desalting device of FIGS. 8 and 9 of Patent Literature 1 in which the distance from the upper surface of the ion-exchange resin R to each strainer is made equal to each other. FIG. 6 is a cross-sectional view taken along a VI-VI line of FIG. 5. The ion-exchange resin is not illustrated in FIG. 6.

The desalting device includes a horizontal partition plate 8 at a lower portion thereof, and the strainers 3 are arranged at the upper side of the partition plate 8 such that they are installed on a level with each other. Each strainer 3 is mounted at the lower surface side of a branch pipe 6 for collecting water, and each branch pipe 6 is connected to a water collecting header pipe 7. Desalted water flows through the strainers 3, the branch pipes 6, and the water collecting header pipe 7 in this order, and is taken out through an outlet 7a.

In this desalting device, the distance from the upper surface of the packed bed of the ion-exchange resin R to each strainer 3 is the same, and uneven flow or shortcut of water to be treated do not occur. A desalting device in which strainers are arranged at the same height is shown also in FIG. 3 of Patent Literature 2.

In such a desalting device in which strainers are arranged at the same height, a space below the strainers 3 is a dead space, and the space within the bulge portion is not used effectively.

LIST OF PATENT LITERATURES

Patent Literature 1: Japanese Patent Publication H9-294934A

Patent Literature 2: Japanese Patent Publication S61-4580B

OBJECT AND SUMMARY OF INVENTION

It is an object of the present invention to provide a desalting device which includes a tower body having a bulge portion bulging downward from its bottom, and which prevents uneven flow and has no dead space within the tower body.

A desalting device according to a first aspect includes a tower body having a bulge portion bulging downward at a bottom portion thereof, an ion-exchange resin packed in the tower body, and a plurality of strainers for collecting water being arranged within the bulge portion, wherein the strainers are arranged only in a central region of an inside of the bulge portion excluding an outer peripheral portion of the bulge portion.

A desalting device according to a second aspect includes a tower body having a bulge portion bulging downward at a bottom portion thereof, an ion-exchange resin packed in the tower body, and a plurality of strainers for collecting water being arranged within the bulge portion, wherein a flow rate of water passing through each strainer arranged in an outer peripheral portion is less than a flow rate of water passing through each strainer arranged in a region inside the outer peripheral portion.

According to the desalting device of the first aspect, since the strainers are arranged only in the central region of the inside of the bulge portion excluding the outer peripheral portion, an average distance from an upper surface of a packed bed of the ion-exchange resin to each strainer is substantially equal to each other, and a flow rate of water passing through each strainer becomes equal to each other. Thus, uneven flow is prevented. In addition, no dead space occurs within the tower body.

The central region is preferably a region of 0.2 to 0.8 times, particularly 0.3 to 0.6 times of a radius in the radial direction from the center of the straight body portion of the tower body.

In the desalting device according to the second aspect, the flow rate of water passing through each strainer arranged in the outer peripheral portion is decreased, and it is preferable that the flow rate of water passing through the strainer at the central portion is equivalent to the major portion of total flow rate and that the flow rate of water passing through the strainer decreases as the strainer is located closer to the outer peripheral side. Thus, uneven flow is prevented. In addition, no dead space occurs also in the second aspect. An orifice is preferably provided in a water introducing pipe connected to each strainer whereby the flow rate of water passing through each strainer in the outer peripheral portion is decreased.

DESCRIPTION OF EMBODIMENTS

Hereinafter, the present invention will be described in more detail.

[Embodiment of the First Aspect]

Figure 1A:
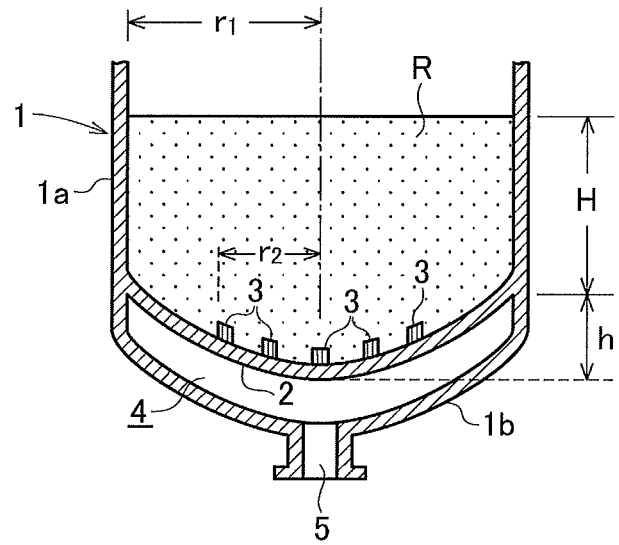
FIGS. 1a and 1b are longitudinal cross-sectional views of a desalting device according to an embodiment.
Figure 1B:
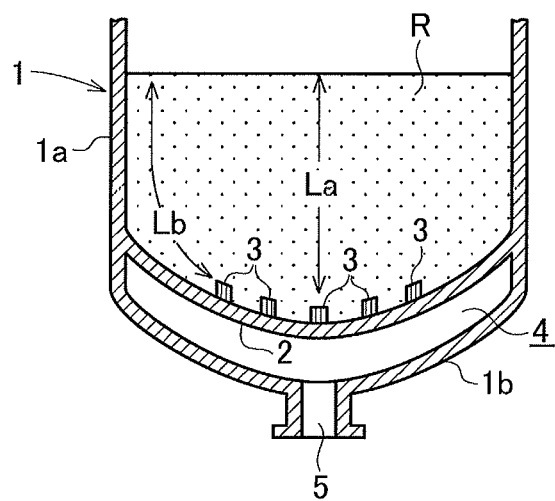

FIG. 1a is a cross-sectional view of a desalting device according to an embodiment of the first aspect, and FIG. 1b is an explanatory diagram in which flow paths La and Lb are added to FIG. 1a.

A tower body 1 includes a straight body portion 1a and a bulge portion 1b consisting a bottom portion. A strainer plate 2 is provided at the upper side of the bulge portion 1b, and a water collecting chamber 4 is formed between the bulge portion 1b and the strainer plate 2. A plurality of strainers 3 are provided on the strainer plate 2. The strainer plate 2 and the bulge portion 1b bulge downward and are smoothly curved so as to be convex downward such that their central side is located at the lower side. The strainer 3 may be a component having a hollow truncated cone shape, a hollow cylindrical shape, or the like.

Figure 4:
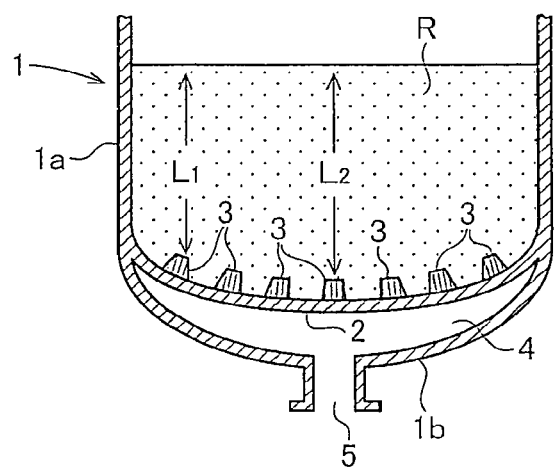
FIG. 4 is a cross-sectional view of a conventional desalting device.
Figure 5:
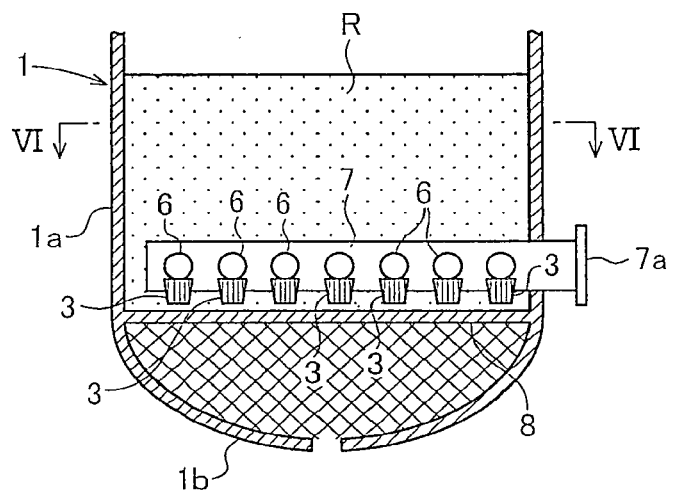
FIG. 5 is a cross-sectional view of a conventional desalting device.
Figure 6:
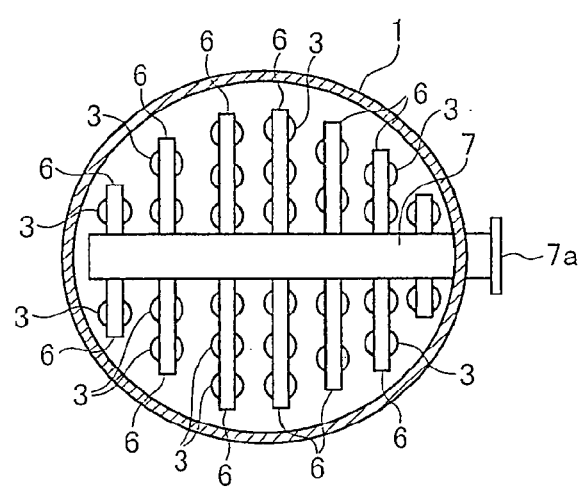
FIG. 6 is a cross-sectional view taken along a VI-VI line of FIG. 5.

The strainers 3 are arranged only in a central region of the strainer plate 2 other than an outer peripheral portion. The radius $r_2$ of the central region is preferably 20 to 80%, particularly 30 to 60%, of the radius $r_1$ of the straight body portion 1a, namely, $r_2$=0.2 to 0.8 $r_1$, particularly, $r_2$=0.3 to 0.6 $r_1$. The tower body has a top portion (not shown) connected to the upper side of the straight body portion 1a and having a dome shape that bulges upward. The other configuration of the embodiment is the same as that in FIG. 4, and the same reference signs denote the same portions.

A ratio h/H of the height h of an ion-exchange resin bed located within the bulge portion to the height H of an ion-exchange resin bed located within the straight body portion 1a is preferably equal to or greater than about 0.25. In addition, the ratio h/d of the diameter d (d=2 $r_1$) of the straight body portion 1a to the bulge portion height h is preferably equal to or greater than 0.05.

In the desalting device configured thus, water in the peripheral portion of the upper surface of the ion-exchange resin packed bed flows along the inner surface of the straight body portion 1a and then the peripheral region of the bulge portion 1b toward the strainers 3 located at the peripheral portion of the central region which is at a radial position of $r_2$ from the center, and its flow path length is Lb in FIG. 1b. Meanwhile, in the axial portion (central portion) of the tower body, water flows substantially along the axial line, and its flow path length is a distance La in the direction of the axial line. Lb is longer than La. However, water from the upper surface of the ion-exchange resin packed bed vertically upward of the strainers 3 in the peripheral portion of the central region also flows into these strainers 3, and as a result, the flow rate of water passing through each strainer 3 in the peripheral portion of the central region located at the radial position of $r_2$ is substantially equal to the flow rate of water passing through the strainer 3 in the central portion of the central region. The flow rate of water passing through each of the other strainers located between them is made substantially equal to the flow rate of water passing through each of these strainers. In this manner, the flow rate of water passing through each strainer 3 is made substantially equal to each other, and uneven flow is prevented. In addition, as shown in FIGS. 1a and 1b, the ion-exchange resin is packed in the tower body 1 other than the water collecting chamber 4, and no wasteful dead space is present therein.

[Embodiment of the Second Aspect]

Figure 2:
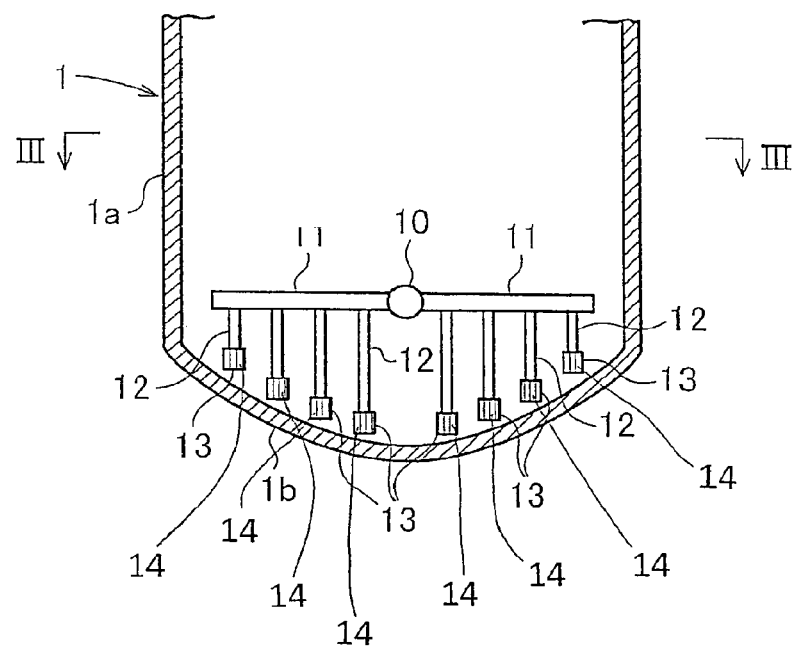
FIG. 2 is a longitudinal cross-sectional view of a desalting device according to an embodiment.
Figure 3:
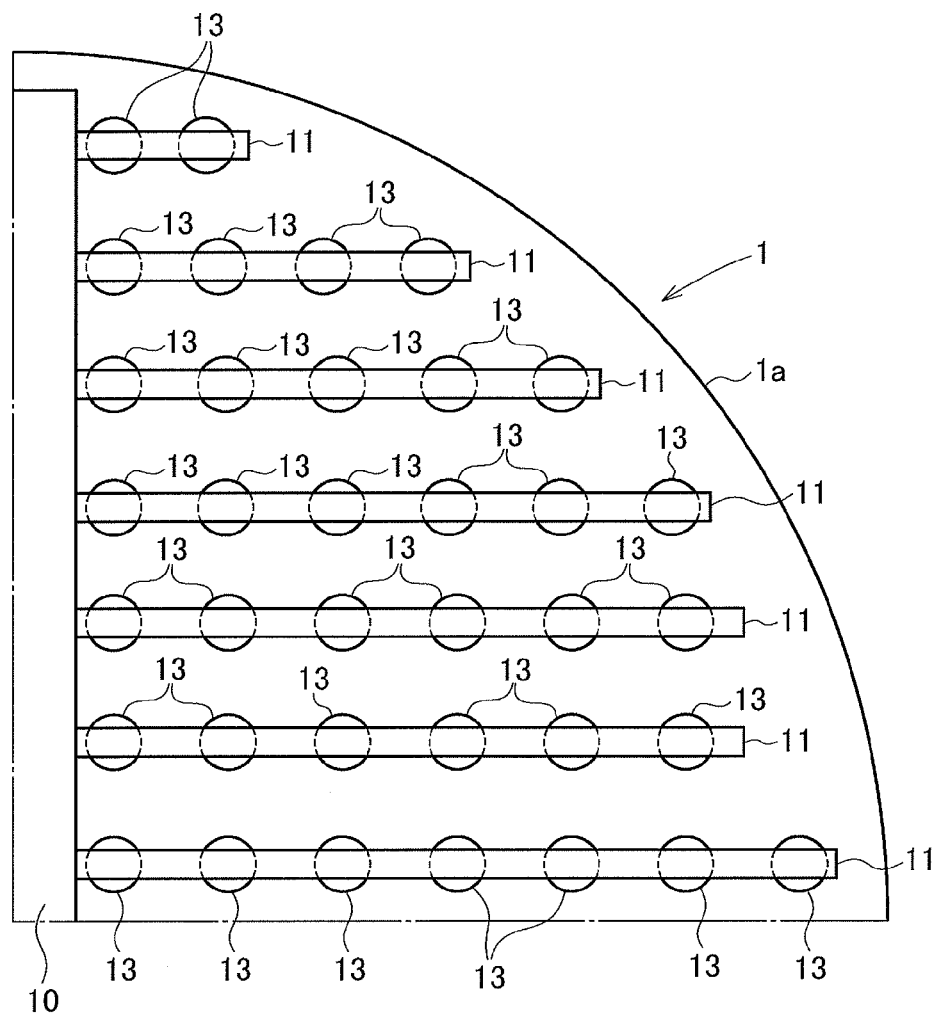
FIG. 3 is a cross-sectional view taken along a line of FIG. 2.

FIG. 2 is a schematic cross-sectional view of a desalting device according to an embodiment of the second aspect. FIG. 3 is a detailed cross-sectional view taken along the III-III line in FIG. 2.

Similarly to the embodiment described above, a tower body 1 includes a straight body portion 1a and a bulge portion 1b. A plurality of strainers 13 are arranged along the inner surface of the bulge portion 1b. In the embodiment, a horizontal water collecting header 10 and a plurality of water collecting branch pipes 11 extending horizontally from the water collecting header 10 in a direction perpendicular to the water collecting header 10 are provided in a lower portion within the tower body 1. The water collecting header 10 extends in the diametrical direction, and it extends through the straight body portion 1a to the outside of the tower.

Water introducing pipes (nozzles) 12 are equipped downward from each water collecting branch pipe 11, and the strainers 13 are mounted on the lower ends of the water introducing pipes 12. Each strainer 13 is a component having a hollow cylindrical shape or truncated cone shape, and a large number of slits are provided in its lateral peripheral surface. Water having flowed into each strainer 13 through the slits is taken out through each water introducing pipe 12, each water collecting branch pipe 11, and the water collecting header 10. As shown in FIG. 3, the strainers 13 are arranged substantially uniformly over the entire area of the inner surface of the bulge portion 1b.

Although illustration is omitted, an ion-exchange resin R is packed in the tower body 1 also in this embodiment similarly to FIGS. 1a and 1b. The preferable ranges of h/H and h/d are the same as in those of the embodiment of FIGS. 1a and 1b.

In this embodiment, an orifice (not shown) is provided in each water introducing pipe 12, and the area of the opening of each orifice is set such that the volume of water passing through each water introducing pipe 12 becomes equal to each other. Thus, uneven flow within the desalting device is prevented. In addition, the ion-exchange resin is packed also in the bulge portion 1b, and no dead space occurs.

Each of the embodiments described above is an example of the present invention, and the present invention may be practiced as another embodiment other than the illustrated ones.

For example, the strainers 3 are mounted on the strainer plate 2 in FIGS. 1a and 1b, but water may be collected using a water collecting header and water collecting branch pipes as in FIG. 2.

In addition, also in FIG. 2, a foot pipe may be provided at each strainer 13, a strainer plate may be provided along the inner surface of the bulge portion to form a water collecting chamber at the lower side of the strainer plate, the foot pipe at each strainer 13 may be mounted on the strainer plate so as to extend therethrough, and an orifice may be provided in each foot pipe, whereby the volume of water passing through each strainer is made equal to each other.

The desalting device according to the present invention is suitably applied to a desalting device that treats a large amount of water and is used in the case with a low ion load. Such a type of desalting device has a low ratio of the resin packed bed height relative to the tower radius. In addition, when water passes through the ion-exchange resin bed, pressure loss occurs. Thus, it is necessary to apply pressure to raw water, and thus the tower of the desalting device has pressure resistance. When the tower diameter is large, if a bottom plate supporting the resin bed has a flat surface, the plate thickness is increased to withstand the water pressure, leading to an increase in the manufacturing cost of the container. Thus, the tower includes preferably an end plate structure having a bulging shape such as a dish shape or a partial sphere shape at a bottom portion of the tower. In such a desalting device, the depth of the dish-shaped or partial sphere-shaped end plate is relatively large with respect to the height of a resin bed packed in a straight body portion, and the h/H ratio exceeds 25% and may be nearly 100%. The present invention is suitably applied to such a desalting device that has the low ratio of the resin packed bed height/the tower diameter.

Specific examples to which the present invention is applied include PWR (pressure water type) and BWR (boiling water type) condensation desalting devices in nuclear power plants and condensation desalting devices in thermal power plants, but the application of the present invention is not limited to them.

As described above, when the depth h of the dish shape or the partial sphere used as a bottom plate supporting the resin bed is relatively large with respect to the height H of the resin packed bed in the straight body portion, the distance from the resin surface to the water collecting strainer closer to the outer peripheral portion is shorter in the case where the water collecting strainers are arranged on the entire surface of the bottom plate along the curvature of the bottom plate. When raw water is passed from the resin surface in a downward flow, the water flows such that the pressure losses from the resin bed surface to the water collecting strainers are equal to each other. Thus, the flow rate of passing water per unit resin cross-section is increased in the outer peripheral portion in which the distance from the resin surface to each water collecting strainer is short. Thus, the flow rate of passing water per unit resin cross-section is increased depending on a radial position on the bottom plate, and a state where the flow rate is high in the outer peripheral portion and low in the central portion, namely, uneven flow, is caused. Thus, breakthrough of the resin is caused earlier.

According to the present invention, in the desalting device in which the dish-shaped or partial sphere-shaped end plate is used as the bottom plate for supporting the ion-exchange resin as described above and which has such a shape that the tower diameter is large with respect to the resin bed height, uneven flow is prevented, and short circuit of a liquid is prevented.

In the first aspect, by arranging the water collecting strainers 3 in the region where the radial position from the central portion is 20 to 80% preferably 30 to 60% of the radius as shown in FIGS. 1a and 1b, water flowing in the outer peripheral portion in which the resin bed height is low flows so as to gradually curve toward the bottom portion, and its flow path length is lengthened. Thus, the resistance of passing water in the outer peripheral portion is increased as compared to the case where the water collecting strainers are arranged on the entirety of the bottom plate, it is possible to suppress uneven flow in which water flows preferentially in the outer peripheral portion, and it is possible to improve a state where a time taken until a fluid element flowing in from the resin bed surface flows out from each water collecting strainer is greatly different depending on the relative position of each water collecting strainer. Thus, a great difference in ion load with respect to the resin depending on the relative position in the radial direction of the resin is improved, the ion load in the entire resin is made uniform, and the life of the entire resin is improved. In addition, when it is possible to improve flow as described above, it is possible to reduce an amount of the resin that is originally packed.

In the second aspect, the nozzles on which the water collecting strainers 13 are mounted as shown in FIG. 2 may be orifice nozzles 14 each opening diameter of which becomes smaller as the orifice nozzle is located closer to the outer peripheral portion where the resin bed is shallow. Thus, the resistance to water flow in the outer peripheral portion is increased, whereby it is possible to suppress uneven flow in which water flows preferentially in the outer peripheral portion, and it is possible to improve a state where a time taken until water flowing in from the resin bed surface flows out from each water collecting strainer 13 is greatly different depending on the relative position of each water collecting strainer. Thus, a great difference in ion load with respect to the resin depending on the relative position in the radial direction of the resin is improved, whereby the ion load in the entire resin is made uniform, and the life of the entire resin is improved. In addition, when it is possible to improve flow as described above, it is possible to reduce an amount of the resin that is originally packed.

EXAMPLES

Example 1

The desalting device in which the strainers are arranged in the central region will be described in more detail by means of examples.

In Example 1, the effects were verified using CFD (computational fluid dynamics) software. The setting conditions are as follows.

Diameter of tower body: 3706 mm
H: 871.5 mm
h: 315.5 mm
H+h: 1187 mm
Radius of curvature of bulge portion: 5600 mm
Radius of curvature of joint portion between bulge portion and straight body portion: 222 mm
Flow rate of passing water: 0.35 m$^3$/sec In Example 1, the arrangement of the water collecting strainers is divided into 8 radial positions of 10 to 100% from the central portion. In analysis, a tracer substance was put uniformly over the entirety of the surface of the resin bed at analysis time 0 [sec.], and injected in only the interval of analysis times 0 to 1 [sec.]. An analysis time step was advanced until the total amount of the tracer substance passed into the water collecting strainers, and the ratio ($\theta_1$) of an analysis time taken until 1% of the total amount of the tracer passed through the water collecting strainers, relative to an average retention time in the resin tower was calculated from the following equation.

$$\theta_1 = t_1/HRT \times 100$$

where

HRT (hydrological retention time) [sec.]=(volume [m$^3$] of device lower portion)/passing water flow rate [m$^3$/sec.], and 1% outflow time ($t_1$) [sec.]: a time until 1% of tracer flows out.

Figure 7:
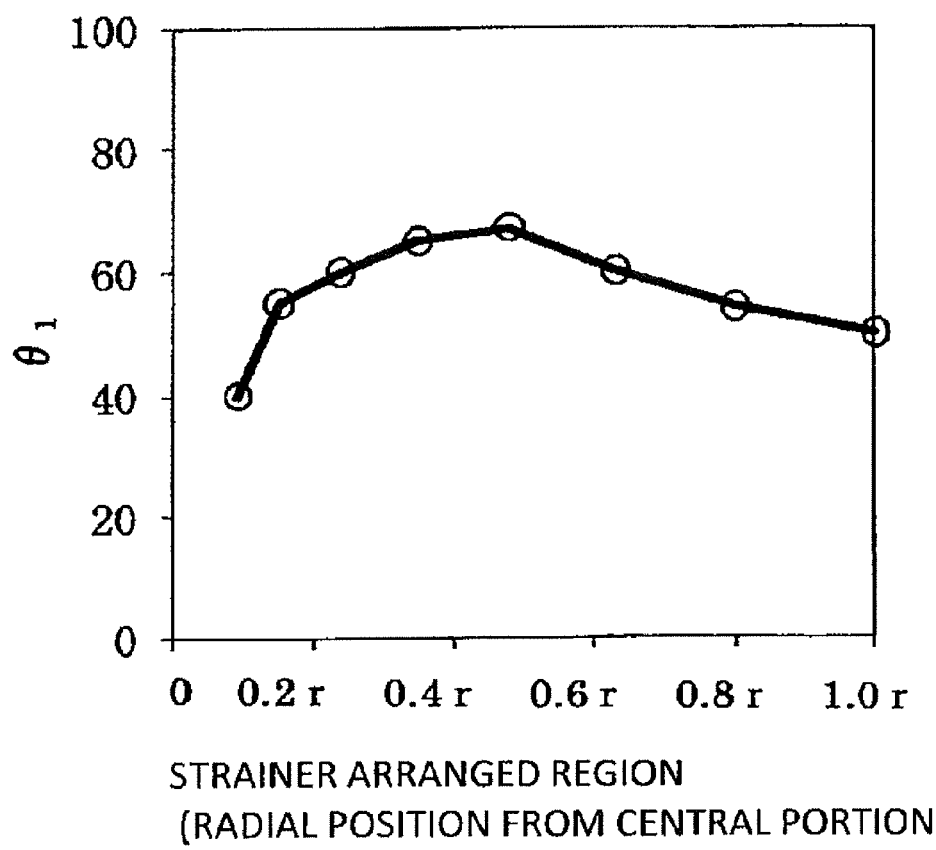
FIG. 7 is a graph showing a result of Examples.

The degree of improvement of uneven flow with respect to the relative positions of the water collecting strainers was quantified by $\theta_1$ obtained from the above equation. The results are shown in FIG. 7.

When the strainers were arranged in the region limited to 40 to 70% relative to the case with a strainer arranged region (a radial position from the central portion) of 100% in the existing structure, $\Delta\theta_1$ between the case with the strainer arranged region of 100% and the case where the strainer arranged region was limited was about 15%. If it is considered that the retention time from the resin surface to each strainer was made uniform by $\Delta\theta_1$, it means that the effective utilization ratio of the resin was improved by 15%.

From the above results, the effect by limiting the water collecting strainer arranged region was confirmed.

Example 2

An example of a desalting device in which the collected water volume of each strainer was made equal to each other by orifices will be described.

In Example 2, the effects were verified using CFD (computation fluid dynamics) software. The setting conditions are as follows:

Diameter of tower body: 3520 mm

H: 600 mm h: 679 mm

H+h: 1279 mm

Radius of curvature of bulge portion: 3520 mm

Radius of curvature of joint portion between bulge portion and straight body portion: 352 mm Flow rate of passing water: 0.35 m³/sec In Example 2, the case where no orifice nozzle was provided was defined as a case a, and the case where orifice nozzles were provided was defined as a case b.

In the cases a and b, the water collecting strainers were classified into seven sections (A to G sections) on the basis of the distance from the ion-exchange resin surface to the nozzle lower end (i.e., into seven sections on the basis of the distance from the center of a circle in FIG. 3). Generated pressure loss is different depending on the distance from the ion-exchange resin surface to the nozzle lower end. Thus, orifices having different opening diameters were provided in the case b. The value of pressure loss at each orifice was calculated from a calculation formula of pressure loss in the resin bed which is represented generally by the following equation.

$$\Delta P=(\alpha u+\beta u^2) \times L$$

where u: linear flow rate, $\alpha$, $\beta$: a constant determined on the basis of the particle diameter distribution of the resin (a calculation value obtained from $\Delta P$, L, and u), L: the length from the resin surface to the nozzle end, and $\Delta P$: a differential pressure of resin bed passing water.

The distances L from the ion-exchange resin surface and the pressure losses $\Delta P$ of the water collecting strainers A to G are as shown in Table 1 below.

TABLE 1

| | Water collecting strainer | | | | | | |
|---|---|---|---|---|---|---|---|
| | A | B | C | D | E | F | G |
| L [mm] | 1174 | 1129 | 1064 | 1024 | 929 | 864 | 803 |
| $\Delta P$ [Pa] | 1279 | 10279 | 22279 | 31279 | 50279 | 63279 | 75379 |

In analysis in the cases a and b, a tracer substance was put uniformly over the entirety of the surface of the resin at analysis time 0 [sec.], and injected in only the interval of analysis times 0 to 1 [sec.]. An analysis time step was advanced until the total amount of the tracer substance passed into the water collecting strainers, and the ratio ($\theta_1$) of an analysis time taken until 1% of the total amount of the tracer passed through the water collecting strainers, relative to an average retention time in the resin tower was calculated from the following equation.

$$\theta_1 = t_1 / HRT \times 100$$

where

HRT (hydrological retention time) [sec.]=(volume [m³] of device lower portion)/passing water flow rate [m³/sec.], and 1% outflow time ($t_1$) [sec.]: a time until 1% of tracer flows out.

The degree of improvement of uneven flow with respect to the relative positions of the water collecting strainers was quantified by $\theta_1$ obtained from the above equation. As a result, the outflow time of 1% of the tracer relative to HRT was 51% in the case a and 54% in the case b.

As presented above, $\theta_1$ which was 51% in the case a with the existing structure was improved to 54% in the case b in which the orifices were provided. $\Delta\theta_1$ between the case a and the case b was 3%. If it is considered that the retention time from the resin surface to each strainer was made uniform by $\Delta\theta_1$, it means that the effective utilization ratio of the resin was improved by 3%.

From the above results, the effect by providing the orifices and limiting the water collecting strainer arranged region was confirmed.

Although the present invention has been described in detail using the specific embodiments, it is obvious to a person skilled in the art that it is possible to make various changes without departing from the intention and the scope of the present invention.

The present application is based on the Japanese Patent Application 2011-077689 filed on Mar. 31, 2011, entire content of which is incorporated herein by reference.

The invention claimed is:

1. A desalting device comprising:
   a tower body having a bulge portion bulging downward at a bottom portion thereof, the bulge portion having an inner surface;
   an ion-exchange resin packed in the tower body;
   a water collecting header extending horizontally into the tower body;
   water collecting pipes disposed in the tower body extending horizontally from opposite sides of the water collecting header;
   a plurality of water introducing pipes extending downwardly from each water collecting pipe into the bulge portion; and
   a plurality of strainers for collecting water, the plurality of strainers being uniformly arranged proximate to and over an entire area of the inner surface of the budge portion and within the bulge portion, each one of said strainers being connected to a respective one of said plurality of water introducing pipes, wherein each of the water introducing pipes contains an orifice therein so that a flow rate of water passing through each strainer arranged in an outer peripheral portion of the bulge portion is less than a flow rate of water passing through each strainer arranged in a region inside the outer peripheral portion, and an opening diameter of each of the orifices located closer to the outer peripheral portion is smaller than each of the orifices located farther from the outer peripheral portion so that a flow rate of water passing through the strainer located at a central portion of the bulge portion is the most, and a flow rate of water passing through a strainer decreases as the strainer is located closer to the outer peripheral portion.

2. A desalting device comprising:

a tower body having a bulge portion bulging downward at a bottom portion thereof, the bulge portion having an inner surface;

an ion-exchange resin packed in the tower body;

water collecting pipes disposed in the tower body and extending horizontally;

a plurality of water introducing pipes extending downwardly from each water collecting pipe into the bulge portion; and a plurality of strainers for collecting water arranged uniformly over the bulge portion, each of the plurality of strainers being connected to each of said plurality of water introducing pipes, wherein each of the water introducing pipes contains an orifice therein so that a flow rate of water passing through each strainer arranged in an outer peripheral portion of the bulge portion is less than a flow rate of water passing through each strainer arranged in a region inside the outer peripheral portion, and an opening diameter of each of the orifices located closer to the outer peripheral portion is smaller than each of the orifices located farther from the outer peripheral portion so that a flow rate of water passing through the strainer located at a central portion of the bulge portion is the most, and a flow rate of water passing through a strainer decreases as the strainer is located closer to the outer peripheral portion.

* * * * *